(12) United States Patent
Stempihar

(10) Patent No.: US 10,460,541 B2
(45) Date of Patent: Oct. 29, 2019

(54) REMOTELY UNLOCKABLE ELECTRICAL PANEL

(71) Applicant: A. G. Stacker Inc., Weyers Cave, VA (US)

(72) Inventor: Eric Stempihar, Bridgewater, VA (US)

(73) Assignee: A.G. STACKER INC., Weyers Cave, VA (US)

( * ) Notice: Subject to any disclaimer, the term of this patent is extended or adjusted under 35 U.S.C. 154(b) by 0 days.

(21) Appl. No.: 16/104,407

(22) Filed: Aug. 17, 2018

(65) Prior Publication Data

US 2019/0057565 A1 Feb. 21, 2019

Related U.S. Application Data

(60) Provisional application No. 62/546,679, filed on Aug. 17, 2017.

(51) Int. Cl.
*G07C 9/00* (2006.01)
*H02G 3/08* (2006.01)

(52) U.S. Cl.
CPC ..... *G07C 9/00309* (2013.01); *G07C 9/00896* (2013.01); *H02G 3/081* (2013.01)

(58) Field of Classification Search
None
See application file for complete search history.

(56) References Cited

U.S. PATENT DOCUMENTS

2013/0221763 A1* 8/2013 Pinto, IV ............... E05B 65/00
307/328
2017/0030109 A1* 2/2017 Duncan ............ G07C 9/00309

* cited by examiner

*Primary Examiner* — Daniell L Negron
(74) *Attorney, Agent, or Firm* — J-Tek Law PLLC; Jeffrey D. Tekanic; Scott T. Wakeman

(57) ABSTRACT

A system includes an electrical panel having a high voltage compartment and a low voltage compartment and a first door shiftable between an open position allowing access to the high voltage compartment and a closed position preventing access to the high voltage compartment and a lock shiftable from a locked position to an unlocked position by an actuator in response to a receipt of an unlock signal. A main disconnect switch outside the electrical panel selectively connects a source of electric current to the electrical panel, and a sensor detects a position of the main disconnect switch and sends an unlock signal to the first actuator in response to a detection that the main disconnect switch is in an OFF position.

20 Claims, 2 Drawing Sheets

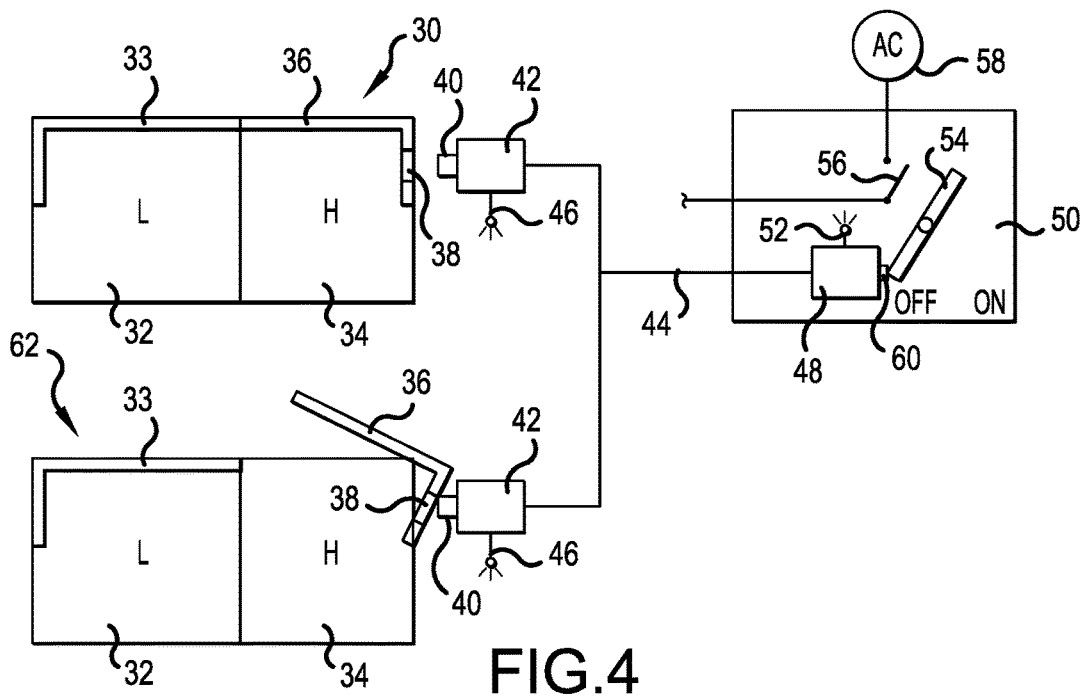
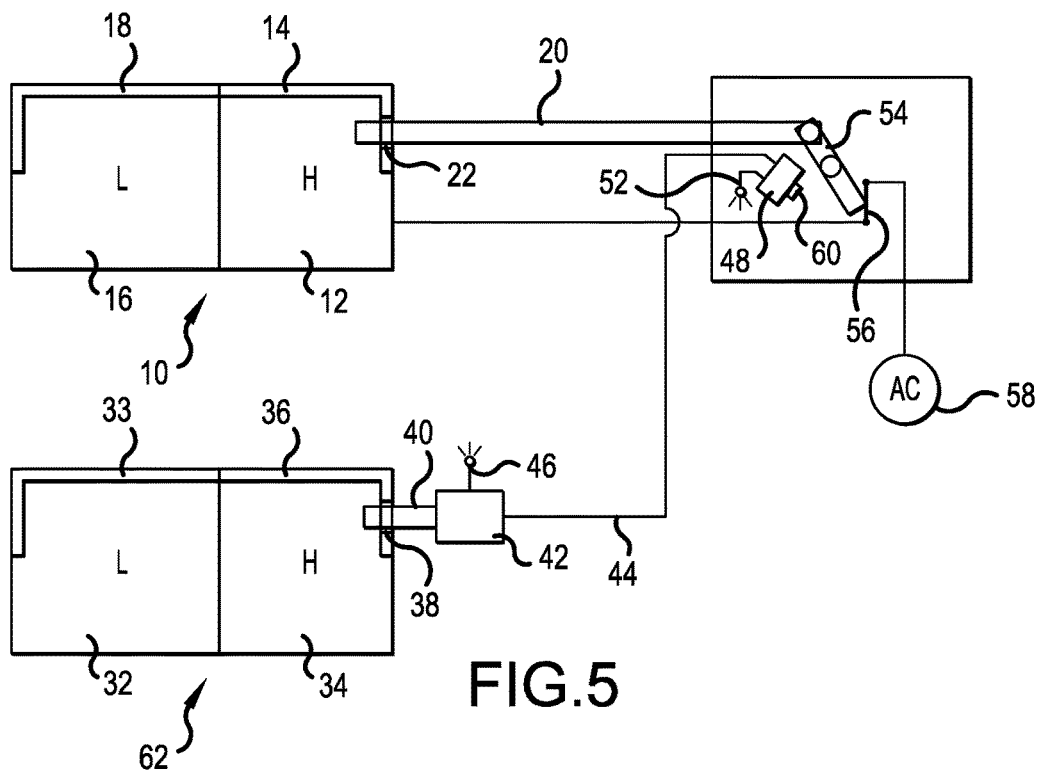

REMOTELY UNLOCKABLE ELECTRICAL PANEL

CROSS-REFERENCE TO RELATED APPLICATIONS

The present application claims the benefit of US Provisional Patent Application No. 62/546,679 filed Aug. 17, 2017, the entire contents of which are hereby incorporated by reference.

TECHNOLOGICAL FIELD

The disclosure is directed to a method and system for remotely unlocking electrical panels, and, more specifically, toward a method and system for remotely unlocking an electrical panel when a switch for disconnecting power from the main electrical panel is actuated.

BACKGROUND

Industrial machines, including, but not limited to sheet transport and stacking systems, are often connected to a source of electricity via electrical panels. These panels may have a high-voltage side at which power from the electrical mains arrives. Some of this electricity is distributed to machine components that require high voltage to operate. The remaining current is stepped down to a lower voltage and provided to a low voltage side of the panel. Portions of the machine that operate on a lower voltage receive power from this low voltage side of the panel. The high and low voltage sides of the electrical panel are accessed through separate doors and are physically separated from each other by a wall inside the electrical panel.

A main disconnect panel is generally associated with the main electrical panel of a machine, and this disconnect panel includes a switch for disconnecting power from the main electrical panel and thus from the entire machine controlled by that main electrical panel.

Various safety regulations require that the high-voltage door of an electrical panel remain locked while electrical power is being supplied to the panel. While it may be possible to bypass such a lock with an appropriate key or code, these access routes are only provided to skilled technicians who are assumed to know how to work with high voltage electricity. Otherwise, the lockout mechanism is intended to keep persons from accessing the high-voltage side of the panel while high voltage is present and to keep even skilled persons from accidently accessing the high-voltage side of the panel.

The high-voltage door may be locked by a bolt that slides between a first position that allows the door to open and a second position in which the bolt engages a portion of the door and thus prevents the door from opening. One way to ensure that the high-voltage door of an electrical panel remains locked at all times while current is flowing to the panel is to mechanically connect the lock for the high-voltage door to the main electrical disconnect switch for the electrical panel. When the main disconnect switch is moved from a first position to a second position to break an electrical circuit, a mechanical linkage between the disconnect switch and the bolt moves the bolt from the second position to the first position and unlocks the door. Returning the main disconnect switch to the ON position returns the bolt to the second position locking the high voltage door. Thus a physical movement of the main disconnect switch is required to unlock the high voltage door.

The mechanical linkage between the main disconnect switch and the bolt may be configured such that the bolt can only move back to the second position when the high-voltage door to the main electrical panel is closed. In this manner, the main disconnect switch cannot be shifted to the ON position until the door is closed. In the alternative, it may be necessary to follow certain lock-out procedures, such as applying a padlock to the main disconnect switch, to avoid accidently returning the main disconnect switch to the ON position when the high voltage door is open.

A schematic illustration of a conventional, mechanical, interlock between a switch of a main disconnect panel and a main electrical panel is provided in FIGS. 1 and 2. The main electrical panel is shown in top plan view to better illustrate the movement of the doors, while the main disconnect panel is shown in side elevational view to illustrate the movement of the ON/OFF switch.

The main electrical panel 10 has a high voltage side 12 with a door 14 (sometimes referred to as a "high voltage door" for identification purposes) and a low voltage side 16 with a door 18 (sometimes referred to as a "low voltage door" for identification purposes). A rod 20 is shiftable between a first position, illustrated in FIG. 1, in which the rod passes through an opening 22 in the door 14 of the high voltage side 12 of the electrical panel 10 to prevent the high voltage door 14 from opening. When the rod 20 is shifted to the position illustrated in FIG. 2, the rod 20 no longer passes through the opening 22, and the high voltage door 14 can be opened.

The rod 20 is mechanically connected to an ON/OFF switch 26 of the main disconnect panel 24. When the switch 26 is in the ON position, illustrated in FIG. 1, the rod 20 is held in the first position, locking the high voltage door 14 and preventing the high voltage door 14 from being opened. The switch 20 in the ON position is also shown schematically as holding an electric switch 28 in a closed position to connect a source 29 of electric current to the high voltage side of the main electrical panel 10 via a wire 27.

When the switch 26 is moved to the OFF position, illustrated in FIG. 2, the movement of the switch 26 physically moves the rod 20 to the second position, withdrawing the rod 20 from the opening 22 and allowing the high voltage door 14 to be opened. The switch 20 in the OFF position is also shown schematically opening the electric switch 28 (or allowing a spring-biased switch to spring open) to disconnect the source 29 of electric current from the high voltage side of the main electrical panel 10.

As will further be appreciated from the depiction of FIG. 2, when the high voltage door 14 is open, the rod 20 cannot move through the opening 22 in the high voltage door 14 because the opening 22 is not aligned with the rod 20, and the switch 26 is therefore physically blocked from returning to the ON position until the high voltage door 14 is closed.

A given piece of machinery may include more than one electrical panel similar to the main electrical panel 10. To distinguish these panels, they may be referred to herein as the "main electrical panel" and one or more "subpanels." Each of the subpanels will have a high voltage side and a low voltage side like the main electrical panel. Each subpanel may also include its own disconnect subpanel which disconnect subpanel includes a mechanical linkage between a disconnect switch and a lock (e.g., a bolt) that secures the high voltage door of the subpanel when current is provided to the particular subpanel. The subpanels can be located on the same machine as the main electrical panel, or, if the main electrical panel is configured to supply electricity to more than one machine, the subpanels can be located on any of the machines supplied by the main electrical panel.

If a person wishes to work on a particular subsystem of a machine, that portion of the machine can be rendered safe by shutting off power at the disconnect subpanel associated with the electrical subpanel that powers the relevant portion of the machine. However, if the main disconnect switch is turned to the OFF position to disconnect power from the main electrical panel and all the subpanels, is still necessary to turn off electrical disconnects at each subpanel because these electrical disconnects also physically coupled to the high voltage doors of each subpanel. It would therefore be desirable to provide a way of simplifying the unlocking of the various electrical panels in a system.

SUMMARY

The present disclosure overcomes the foregoing problems by using an electrically actuatable lock, e.g., one operated by a motor or solenoid, to secure the doors of a) all high voltage panel doors in a system including the high voltage door of the main electrical panel orb) the high voltage panel doors of all subpanels connected to the main electrical panel while the high voltage door of the main electrical panel is secured with a mechanical interlock as in the conventional art. While a solenoid is described herein as a simple mechanism for moving a lock bolt linearly between first and second positions, other arrangements, including electric motors, etc. could likewise be used for shifting a locking mechanism.

An aspect of the present disclosure therefore comprises a system that includes a first electrical panel having a high voltage compartment and a low voltage compartment and a first door shiftable between an open position allowing access to the high voltage compartment and a closed position preventing access to the high voltage compartment. The system also includes a first lock shiftable between a locked position locking the first door and an unlocked position unlocking the first door and a first actuator configured to shift the first lock from the locked position to the unlocked position in response to a receipt of an unlock signal. The system also includes a main disconnect switch outside the first electrical panel that is shiftable between an ON position for connecting a source of electric current to the first electrical panel and an OFF position for disconnecting the source of electric current from the first electrical panel. The system has a sensor configured to detect a position of the main disconnect switch and to send the unlock signal to the first actuator in response to a detection that the main disconnect switch is in the OFF position.

Another aspect of the disclosure comprises a method that includes providing a system as described above and detecting a position of the main disconnect switch and sending the unlock signal to the actuator in response to a detection that the main disconnect switch is in the OFF position.

A further aspect of the disclosure includes a system having a first electrical panel having a high voltage compartment and a low voltage compartment and a first door shiftable between an open position allowing access to the high voltage compartment and a closed position preventing access to the high voltage compartment. The system also includes a main disconnect switch outside the first electrical panel shiftable between an ON position for connecting a source of electric current to the high voltage compartment of the first electrical panel and an OFF position for disconnecting the source of electric current from the high voltage compartment of the first electrical panel and means for selectably unlocking the first door based on a detected position of the main disconnect switch.

BRIEF DESCRIPTION OF THE DRAWINGS

FIG. 4 schematically illustrates a system according to another embodiment of the present disclosure that includes a main electrical panel and a subpanel, each shown in top plan view, and a main disconnect switch, shown in side elevational view, and a solenoid for selectively locking the high voltage door of each panel.

FIG. 5 schematically illustrates a system according to another embodiment of the present disclosure that includes a main electrical panel and a subpanel, each shown in top plan view, and a main disconnect switch, shown in side elevational view, and a solenoid for selectively locking the high voltage door of the subpanel.

DETAILED DESCRIPTION

Figure 1:
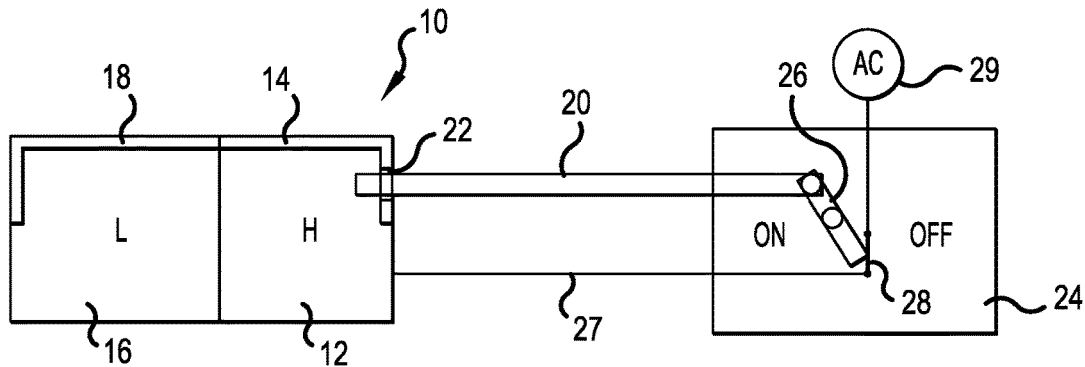
FIG. 1 schematically illustrates a conventional electrical panel, shown in top plan view, connected to a conventional main disconnect switch, shown in side elevational view, with the main disconnect switch in the ON position and the high voltage door of the electrical panel locked.
Figure 2:
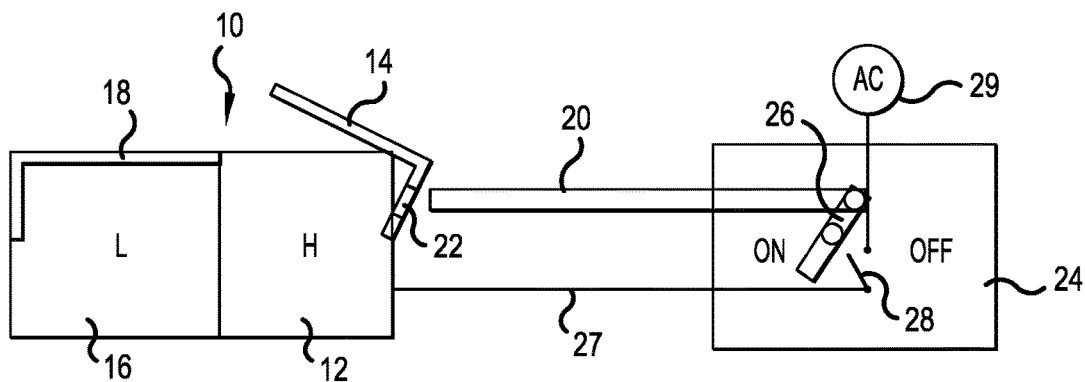
FIG. 2 shows the electrical panel of FIG. 1 with the main disconnect switch in the OFF position and the high voltage door unlocked and open.
Figure 3:
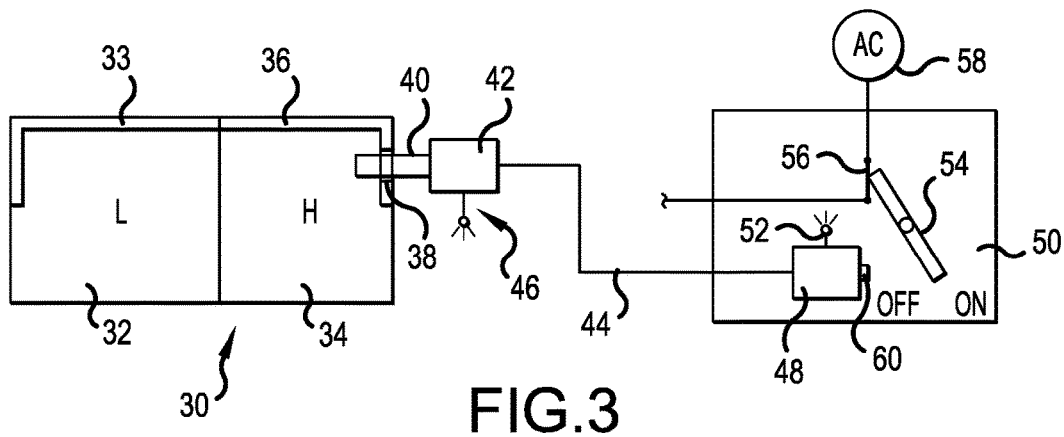
FIG. 3 schematically illustrates a system according to an embodiment of the present disclosure that includes an electrical panel, shown in top plan view, and a main disconnect switch, shown in side elevational view, and a solenoid for selectively locking the high voltage door of the electrical panel.

Referring now to the drawings, wherein the showings are for purposes of illustrating embodiments of the present disclosure only and not for the purpose of limiting same, FIG. 3 shows a main electrical panel 30 having a low voltage side 32 (or "L") protected by a door 33 (a "low voltage door") and a high-voltage side 34 (or "H") protected by a door 36 (a "high-voltage door"). The descriptions "high voltage" and "low voltage" identify the location of the doors and not any particular voltage at which the doors themselves are maintained. The high voltage door 36 includes an opening 38 and can be locked by extending a bolt 40 through the opening 38 and unlocked by retracting the bolt 40. As will be appreciated from the positions of the bolt 40 and the opening 38 in the high voltage door 36 of FIG. 4, the bolt 40 cannot be inserted through the opening 38 in the high voltage door 36 when the high voltage door 36 is open.

The bolt 40 is controlled by a solenoid 42 which shifts the bolt 40 between an extended position and a retracted position in response to a signal received over a wire 44 or wirelessly by a receiver 46. While both a wire 44 and a receiver 46 are illustrated, in general, embodiments will communicate by only one of these methods.

The solenoid 42 is controlled by a controller 48 in a main disconnect panel 50 which controller 48 is either connected to the wire 44 to send signals over the wire 44 to the solenoid 42 or includes a transmitter 52 to transmit signals to the receiver 46 of the solenoid 42. The controller 48 may be as simple as a conventional switch that supplies current to the solenoid 42 to retract the bolt 40 when a physical button (e.g., element 60) is pushed or may comprise a microprocessor or microcontroller (not illustrated) that controls a current flow in response to signal inputs.

The main disconnect panel 50 includes a first mechanical switch 54 that functions to both selectively open and close an electrical switch 56 that connects a source 58 of electrical current to the high voltage side 34 of the main electrical panel 30 and to selectively actuate a second mechanical switch 60 on the controller 48 to send a signal to the solenoid 42. Instead of a second mechanical switch, the main disconnect panel 50 may be provided with a different sensor, optical or magnetic, for example, for detecting the position of the first mechanical switch and generating a signal in response thereto.

The first mechanical switch 54 is shown in the ON position in the main disconnect panel 50 in FIG. 3 and in the OFF position in the main disconnect panel 50 of FIG. 4. In the ON position, the first mechanical switch 54 holds the electrical switch 56 closed and does not engage the second mechanical switch 60. In this configuration, the source 58 is electrically connected to the main electrical panel 30 and the bolt 40 extends through the opening 38 in the high voltage door 36 to lock the high voltage door 36. When the first mechanical switch 54 is shifted to the OFF position, as shown in FIG. 4, it releases the electrical switch 56 allowing it to open and break the electrical circuit and presses against the second mechanical switch 60 to actuate the solenoid 42 and retract the bolt 40. In this configuration, the source 58 is electrically disconnected from the main electrical panel 30 and the high voltage door 36 is unlocked and can be opened. In this embodiment, the electrical switch 56 is spring biased toward an open position; in other embodiments, the first mechanical switch could be configured to physically move the electrical switch between the open and closed positions. Furthermore, in the present embodiment, the solenoid 42 leaves the bolt 40 in the extended position when no power is applied, and a voltage signal is applied to the solenoid 42 to retract the bolt 40. However, it is also possible to apply a voltage to the solenoid 42 to maintain the bolt 40 in the extended position. Thus the signal that causes the solenoid 42 to shift the bolt 40 can be either a positive (or negative) voltage or a 0 voltage. That is, the "signal" that actuates the solenoid can be a shift from one voltage level to another, including a level of 0 volts.

Because the locking of the high-voltage door 36 is accomplished via electrical signals instead of via a direct mechanical link, it is no longer necessary to locate the main disconnect panel 50 in close proximity to the main electrical panel 30. Furthermore, as illustrated in FIG. 4, the first mechanical switch 54 of a single main disconnect panel 50 can be used to electrically control more than one solenoid, for example, the solenoid 42 of the main electrical panel 30 and a solenoid 42' of a subpanel 62. Thus it is no longer necessary to turn off every electrical disconnect panel at every subpanel before working on those subpanels since the high voltage panels of the subpanels are unlocked automatically when power is disconnected from the main disconnect panel.

In addition, as illustrated in FIG. 5, a conventional bolt 20 can be used to lock and unlock the high voltage door 14 of a conventional main electrical panel 10 while the first mechanical switch 54 can actuate the controller 48 to control a solenoid 42 in one or more subpanels 62.

Different methods exist for preventing the main disconnect switch from being returned to the ON position while the high voltage doors of the subpanels are open. These include standard procedures like padlocking the main disconnect switch until the state of all the doors of the subpanels can be verified. However, it is also possible for the solenoids to provide feedback to the main disconnect panel. For example, the high voltage door 36 of the subpanel 62 illustrated in FIG. 4 is open, and it will be appreciated from this figure that the bolt 40 cannot move into the opening 38 in the high voltage door 36 because the opening 38 is not aligned with the bolt 40. The solenoid 42 or a sensor (not illustrated) associated therewith can be configured to send a signal indicating that the bolt 38 cannot be extended which can be interpreted as an indication that the high voltage door 36 of a given subpanel 62 is not properly closed. Such feedback with or without conventional safeguards could be used to help ensure that all high-voltage doors are locked before restoring power to the system.

The present invention has been described above in terms of embodiments. Modifications and additions to these embodiments will become apparent to persons of ordinary skill in the art upon a reading of the foregoing disclosure. It is intended that all such modifications comprise a part of the present invention.

What is claimed is:

1. A system comprising:
    a first electrical panel having a high voltage compartment and a low voltage compartment and a first door shiftable between an open position allowing access to the high voltage compartment and a closed position preventing access to the high voltage compartment;
    a first lock shiftable between a locked position locking the first door and an unlocked position unlocking the first door;
    a first actuator configured to shift the first lock from the locked position to the unlocked position in response to a receipt of an unlock signal;
    a main disconnect switch outside the first electrical panel shiftable between an ON position for connecting a source of electric current to the first electrical panel and an OFF position for disconnecting the source of electric current from the first electrical panel;
    a sensor configured to detect a position of the main disconnect switch and to send the unlock signal to the first actuator in response to a detection that the main disconnect switch is in the OFF position;
    a second electrical panel having a high voltage compartment and a low voltage compartment and a second door shiftable between an open position allowing access to the high voltage compartment of the second electrical panel and a closed position preventing access to the high voltage compartment of the second electrical panel;
    a second lock shiftable between a locked position locking the second door and an unlocked position unlocking the second door; and
    a second actuator in communication with the sensor and configured to shift the second lock from the locked position to the unlocked position in response to the receipt of the unlock signal.

2. The system of claim 1, wherein the unlock signal are transmitted wirelessly to the first actuator and to the second actuator.

3. The system of claim 1, including a first wire connecting the sensor to the first actuator and a second wire connecting the sensor to the second actuator and wherein the unlock signal is transmitted over the first wire and over the second wire.

4. The system of claim 1, wherein the first electrical panel has a third door shiftable between an open position allowing access to the low voltage compartment and a closed position preventing access to the low voltage compartment, the third door being operable independently of the first door.

5. The system of claim 1, wherein the first actuator comprises a solenoid.

6. The system of claim 5, wherein the sensor includes an element configured to be physically moved by the main disconnect switch when the main disconnect switch shifts to the OFF position.

7. The system of claim 5, wherein the first lock includes a bolt that extends into an opening in the first door when the first lock is in the locked position.

8. The system of claim 1, wherein the sensor is configured to send a lock signal to the first actuator in response to a detection that the main disconnect switch is in the ON position.

9. The system of claim 1, wherein the sensor is an optical sensor.

10. The system of claim 1, wherein the sensor is a magnetic sensor.

11. The system of claim 1, wherein the main disconnect switch is located at the first electrical panel and wherein the second electrical panel is spaced from the first electrical panel.

12. A method comprising:
providing a first electrical panel and a second electrical panel, each of the first and second electrical panels including a high voltage compartment and a low voltage compartment and a door shiftable between an open position allowing access to the high voltage compartment and a closed position preventing access to the high voltage compartment, and a lock shiftable between a locked position locking the door and an unlocked position unlocking the door and an actuator configured to shift the lock from the locked position to the unlocked position,
providing a main disconnect switch at the first electrical panel shiftable between an ON position for connecting a source of electric current to the high voltage compartment of the first electrical panel and an OFF position for disconnecting the source of electric current from the high voltage compartment of the first electrical panel;
detecting a position of the main disconnect switch; and
sending an unlock signal to the actuator of the second electrical panel in response to a detection that the main disconnect switch is in the OFF position.

13. The method of claim 12 including transmitting the unlock signal wirelessly.

14. The method of claim 12 including transmitting the unlock signal over a wire.

15. The method of claim 12,
wherein the first electrical panel has a third door shiftable between an open position allowing access to the low voltage compartment and a closed position preventing access to the low voltage compartment,
the method including opening the third door when the first lock is in the locked position.

16. The method of claim 15, including pressing a portion of the main disconnect switch against a sensor to generate the unlock signal.

17. The method of claim 12, wherein the second electrical panel is spaced from the first electrical panel.

18. The method of claim 17 including sending the unlock signal to the actuator of the first electrical panel in response to the detection that the main disconnect switch is in the OFF position.

19. A system comprising:
a first electrical panel having a first high voltage compartment and a first low voltage compartment and a first door shiftable between an open position allowing access to the first high voltage compartment and a closed position preventing access to the first high voltage compartment;
a first lock shiftable between a locked position locking the first door and an unlocked position unlocking the first door;
a first actuator configured to shift the first lock from the locked position to the unlocked position;
a second electrical panel spaced from the first electrical panel and having a second high voltage compartment and a second low voltage compartment and a second door shiftable between an open position allowing access to the second high voltage compartment and a closed position preventing access to the second high voltage compartment;
a second lock shiftable between a locked position locking the second door and an unlocked position unlocking the second door;
a second actuator configured to shift the second lock from the locked position to the unlocked position;
a main disconnect switch at the first electrical panel shiftable between an ON position for connecting a source of electric current to the first electrical panel and an OFF position for disconnecting the source of electric current from the first electrical panel;
a sensor configured to detect a position of the main disconnect switch and to send an unlock signal to the second actuator in response to a detection that the main disconnect switch is in the OFF position.

20. The system of claim 19, wherein the sensor is configured to send the unlock signal to the first actuator.

* * * * *